United States Patent
Metz (10) Patent No.: US 8,582,139 B2
(45) Date of Patent: Nov. 12, 2013

(54) DRIVER UPGRADING

(75) Inventor: Kristofer Erik Metz, Meridian, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2522 days.

(21) Appl. No.: 10/299,168

(22) Filed: Nov. 19, 2002

(65) Prior Publication Data

US 2004/0098714 A1   May 20, 2004

(51) Int. Cl.
   *G06F 3/12*   (2006.01)
(52) U.S. Cl.
   USPC ........... 358/1.15; 358/515; 717/168; 719/321
(58) Field of Classification Search
   USPC ................... 717/168; 719/321; 358/1.15, 515
   See application file for complete search history.

(56) References Cited

U.S. PATENT DOCUMENTS

| | | | | |
|---|---|---|---|---|
| 5,982,996 | A | | 11/1999 | Snyders ........................ 395/114 |
| 6,115,133 | A | | 9/2000 | Watanabe .................... 358/1.15 |
| 6,125,372 | A | * | 9/2000 | White ................................. 1/1 |
| 6,184,998 | B1 | * | 2/2001 | Tebeka ......................... 358/1.15 |
| 6,356,915 | B1 | * | 3/2002 | Chtchetkine et al. ......... 707/823 |
| 6,825,941 | B1 | * | 11/2004 | Nguyen et al. ............... 358/1.15 |
| 6,915,514 | B1 | * | 7/2005 | Machida ....................... 717/174 |
| 6,985,088 | B2 | * | 1/2006 | Goetz et al. .............. 340/870.07 |
| 7,047,528 | B2 | * | 5/2006 | Iida ............................... 717/170 |
| 2002/0067504 | A1 | * | 6/2002 | Salgado et al. .............. 358/1.15 |
| 2002/0110397 | A1 | * | 8/2002 | Bussell ......................... 400/104 |
| 2003/0053107 | A1 | * | 3/2003 | Kizaki et al. ................. 358/1.13 |
| 2003/0053113 | A1 | * | 3/2003 | Nishikawa et al. .......... 358/1.14 |
| 2003/0072031 | A1 | * | 4/2003 | Kuwata et al. ............... 358/1.15 |
| 2003/0112456 | A1 | * | 6/2003 | Tomita et al. ................ 358/1.13 |
| 2003/0208569 | A1 | * | 11/2003 | O'Brien et al. ............... 709/221 |
| 2003/0220988 | A1 | * | 11/2003 | Hymel .......................... 709/220 |

* cited by examiner

*Primary Examiner* — Benjamin O Dulaney (57) ABSTRACT

Methods, systems, and arrangements enable the maintenance of driver settings when upgrading from an old driver having a first name to a new driver having a second different name. In certain described implementations, a driver upgrade is effectuated by first ascertaining driver settings for a peripheral and then upgrading a driver for the peripheral to an upgraded driver by replacing the former with the latter. After driver replacement, the driver settings for the peripheral are reestablished despite that the driver replacement entails changing driver names. Exemplary implementations may be directed to updating printer drivers in Microsoft Windows® operating system environments. Exemplary implementations may also include driver upgrading using an installation utility or driver upgrading using a new driver.

50 Claims, 6 Drawing Sheets

DRIVER UPGRADING

TECHNICAL FIELD

This disclosure relates in general to the field of driver upgrades in computing systems, and in particular, by way of example but not limitation, to enabling the maintenance of driver settings when upgrading drivers of peripherals in computing systems.

BACKGROUND

Printers, other imaging appliances, and peripherals in general have become an important aspect of information processing. In fact, peripherals are increasingly utilized in commercial, educational, and entertainment environments in conjunction with a computer. In any of these diverse environments, the computer connected to the peripheral typically utilizes an operating system. One prevalent operating system is the Windows® operating system from Microsoft® Corporation. Consequently, many peripherals are controlled at least partly by the Microsoft Windows® operating system. More specifically, many peripherals are controlled by the Microsoft Windows® operating system using one or more (device) drivers.

For example, printers are controlled by the Microsoft Windows® operating system using printer drivers. A particular printer driver in conjunction with the Microsoft Windows® operating system enables printer settings to be established for and print jobs to be sent to a corresponding printer. The manufacturer of the printer usually provides the corresponding printer driver for use with the Microsoft Windows® operating system. From time to time, the manufacturer of the printer may wish to update the printer driver to provide new functionality, to eliminate problems with a current version, to improve interaction with the operating system, and so forth. The Microsoft Windows® operating system provides a function call for upgrading printer drivers.

The Microsoft Windows® operating system function call for upgrading printer drivers is termed DrvUpgradePrinter. When the DrvUpgradePrinter function is called, the Microsoft Windows® operating system replaces a current printer driver with a new printer driver. The Microsoft Windows® operating system includes a built-in protection feature that is intended to avoid problems in which the new printer driver does not work or does not work properly, in which the operating system is subject to crashing because of the printer driver upgrading, and so forth. This built-in protection feature compares a name of the current printer driver to a name of the new printer driver. If the names match, then the printer driver settings for the current printer driver are maintained for use with the new printer driver. If, on the other hand, the name of the current printer driver does not match the name of the new printer driver, then the Microsoft Windows® operating system deletes the printer driver settings for the current printer driver so that they cannot be maintained for use with the new printer driver.

SUMMARY

Methods, systems, and arrangements enable the maintenance of driver settings when upgrading from an old driver having a first name to a new driver having a second different name. In certain described implementations, a driver upgrade is effectuated by first ascertaining driver settings for a peripheral and then upgrading a driver for the peripheral to an upgraded driver by replacing the former with the latter. After driver replacement, the driver settings for the peripheral are reestablished even though the driver replacement entails changing driver names. Exemplary implementations may be directed to updating printer drivers in Microsoft Windows® operating system environments. Exemplary implementations may also include driver upgrading using an installation utility or driver upgrading using a new driver.

In a described computer or computing system implementation, a peripheral may be operated with a driver having a first name using multiple driver settings. To upgrade the driver of the peripheral, (i) a snapshot of the multiple driver settings is recorded; (ii) the driver having the first name is uninstalled, and a driver having a second name is installed, the second name differing from the first name; and (iii) the multiple driver settings from the recorded snapshot are reestablished. The computer or computing system may then operate the peripheral with the driver having the second name using the multiple driver settings.

BRIEF DESCRIPTION OF THE DRAWINGS

In the Drawings, like numerals are used for like and/or corresponding features, aspects, and components of the various FIGS. 1-8.

DETAILED DESCRIPTION

Figure 1:
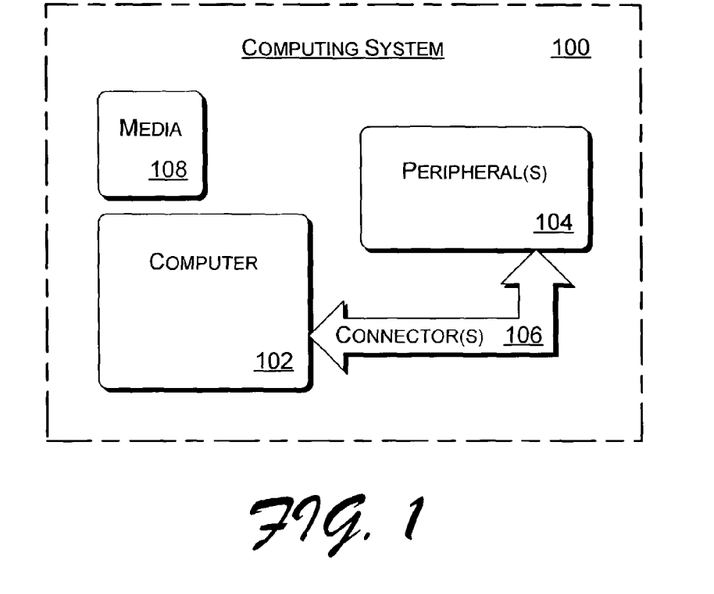
FIG. 1 illustrates an exemplary computing system having a computer, a peripheral, and media.

FIG. 1 illustrates an exemplary computing system 100 having a computer 102, a peripheral 104, and media 108. One or more computers 102 are connected to one or more peripherals 104 via one or more connectors 106. Connectors 106 enable unidirectional or bidirectional communication between computer 102 and peripheral 104 so that computer 102 may control and otherwise utilize peripheral 104. One or more media 108 are capable of storing data, instructions, and general information for use by and/or for other interaction with computer 102 and peripheral 104. Media 108 may be integral with or removable from either or both of computer 102 and peripheral 104.

Computer 102 may be realized using any single or combination of computers including a personal computer, a handheld or palm-sized computer, a network of computers, a server, any general processing device, and so forth. Connectors 106 may be realized using any wired or wireless medium and using one or more of such mediums. For example, connector 106 may be a Universal Serial Bus (USB) connector, an Ethernet-based connector, a Bluetooth® connector, a local area network (LAN) connector, the Internet, or any other connector or combination of connectors. More generally, computer 102 may be considered to be coupled to peripheral 104.

Peripheral 104 may be realized as a printer, an imaging appliance in general, a monitor, a personal digital assistant (PDA), a mobile phone, and so forth. A printer may be considered any device that is capable of rendering a hard copy image, including a multifunction device, a fax machine, a copier, and so forth. An imaging appliance may be considered as any device that is capable of rendering an image electronically and/or in hard copy form.

Media 108 may be realized generally as storage media such as a volatile or non-volatile memory, transmission media such as a wireline or wireless electromagnetic transport mechanism, some combination thereof, and so forth. Any of these media forms may be integrated with or removably coupled to computer 102, peripheral 104, or both.

Figure 2:
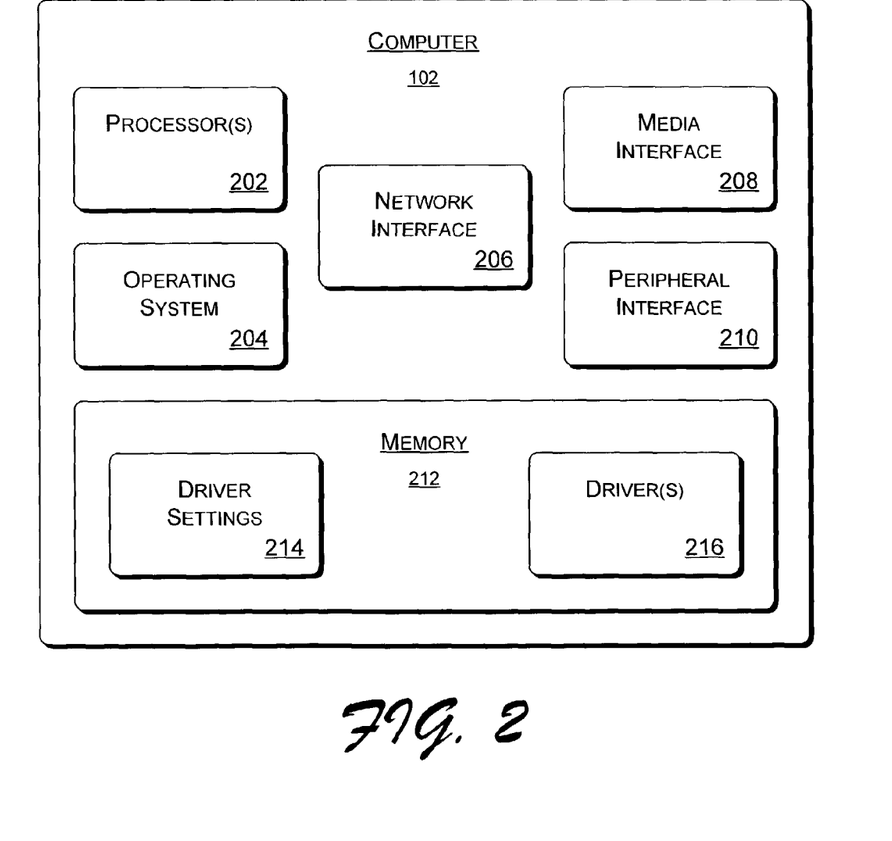
FIG. 2 illustrates an exemplary computer.

FIG. 2 illustrates an exemplary computer 102. Computer 102 includes one or more processor(s) 202 that process various instructions to control the operation of and to communicate with other electronic and/or computing devices. Such instructions include those instructions of operating system 204. In certain implementations, operating system 204 comprises the Windows® operating system from Microsoft® Corporation. However, other operating systems such as Unix, Linux, etc. may alternatively comprise operating system 204. Network interface 206 is used to connect computer 102 to one or more networks such as an IEEE 802.11b network, the Internet, a LAN, and so forth.

Computer 102 also includes a media interface 208 for accepting removable media, including removable implementations of media 108 (of FIG. 1). Peripheral interface 210 enables computer 102 to control, use, and otherwise interact with peripheral 104 over, for example, connectors 106. Alternatively, some implementations may enable the coupling of peripheral 104 to computer 102 via network interface 206. Computer 102 includes memory 212. Memory 212 may also be realized in any of the memory formats or combination of memory formats described above with reference to media 108, including as a RAM and/or as a non-volatile memory that is based on solid-state or rotating-disk technology. Memory 212 stores driver settings 214 and one or more drivers 216. Also, memory 212 may store operating system 204.

Respective drivers 216 are utilized by operating system 204 when computer 102 is interacting with respective peripherals 104. When utilizing a respective driver 216, operating system 204 may refer to corresponding driver settings from driver settings 214. For example, in a printer peripheral 104 implementation, printer driver settings are stored in driver settings 214. When operating system 204 is interacting with the printer peripheral 104, operating system 204 utilizes a printer driver from drivers 216 and the printer driver settings from driver settings 214. The printer driver and the printer driver settings may be used, for example, to configure the printer peripheral 104, to send a print job to the printer peripheral 104, and so forth.

Figure 3:
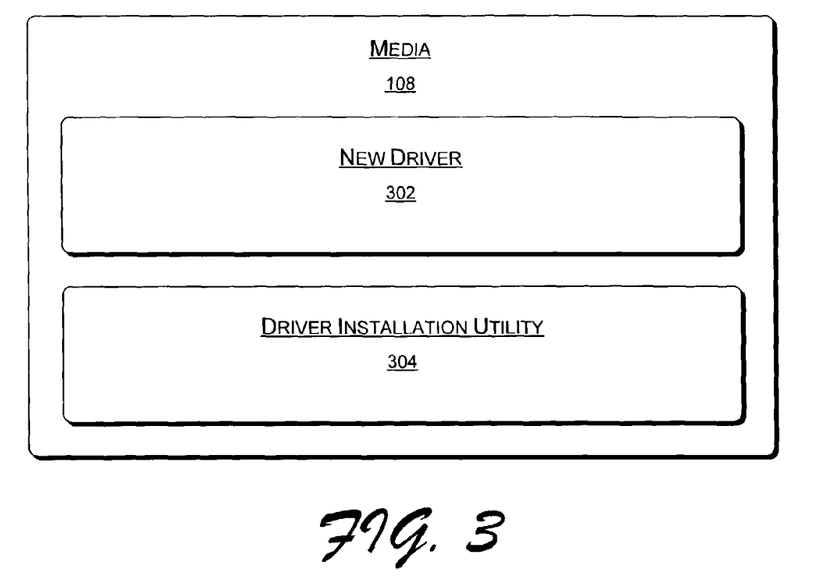
FIG. 3 illustrates exemplary media.

FIG. 3 illustrates exemplary media 108. Media 108 may be realized specifically as flash memory and/or programmable read-only memory (PROM), random access memory (RAM), read-only (non-erasable) memory (ROM), electrically programmable read-only memory (EPROM), electrically erasable programmable read-only memory (EEPROM), some other non-volatile (e.g., solid state) memory, a mass memory such as a hard disk, a network transmission medium or signal propagating thereon, an optical or magneto-optical memory format, a floppy disk, some combination thereof, and so forth.

Media 108 includes a new driver 302 and/or a driver installation utility 304. New driver 302 can replace an old/current/previous driver (e.g., of drivers 216 (of FIG. 2)). New driver 302 is typically an updated or otherwise improved version of the previous driver.

In described implementations, new driver 302 is given a new or different name as compared to the name of the previous driver. New driver 302 is given a new or different name, for example to indicate that new driver 302 possesses a new or different code base, even though the new driver may be more-closely compatible with the old driver. Driver installation utility 304, as described further herein, may comprise part or all of media 108 to facilitate the upgrading of a particular driver from an old driver to a new driver 302.

Figure 4:
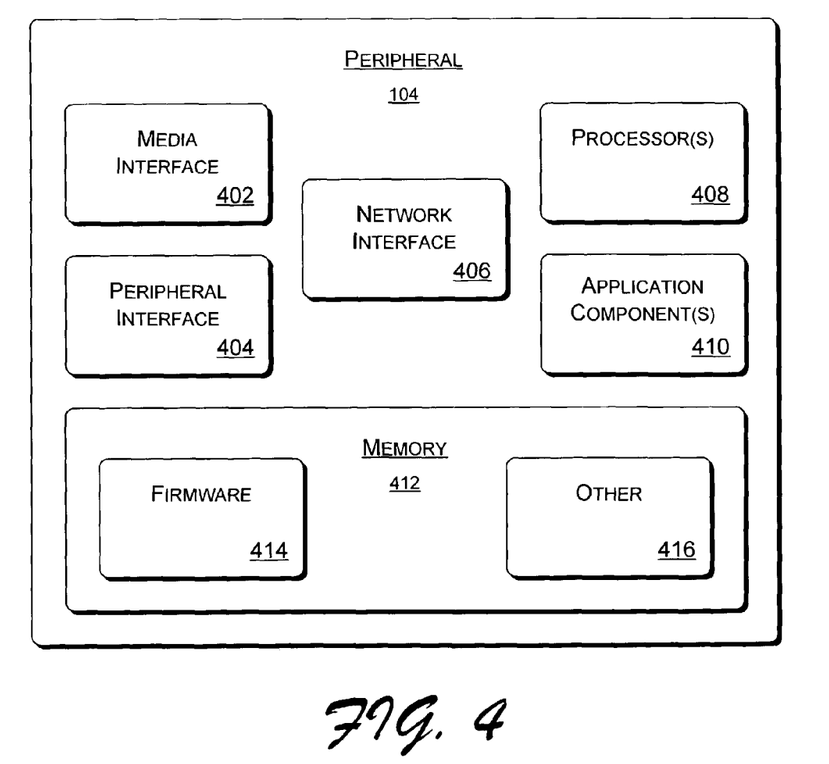
FIG. 4 illustrates an exemplary peripheral.

FIG. 4 illustrates an exemplary peripheral 104. Peripheral 104 may include one or more of a media interface 402, a peripheral interface 404, and a network interface 406. These interfaces 402, 404, and 406 operate analogously to interfaces 208, 210, and 206, respectively, as described above with reference to FIG. 2. For example, media interface 402 may accept media 108 for receiving new driver 302 and/or driver installation utility 304 directly and/or for forwarding same to computer 102 over peripheral interface 404. Additionally, peripheral 104 may be controlled by computer 102 via peripheral interface 404 and/or network interface 406.

Peripheral 104 may also include one or more processors 408 and one or more application components 410. Processors 408 process various instructions to control the operation of peripheral 104 and to communicate with other electronic and/or computing devices such as computer 102. These instructions may include those of application components 410 and/or firmware 414. Application components 410, when included as part of peripheral 104, provide a runtime environment in which software applications or components can run or execute. There are many different types of available runtime environments, and they facilitate the extensibility of peripheral 104 by allowing various flexible and fluid interfaces to be defined that, in turn, allow the application components 410 to interact with peripheral 104.

Peripheral 104 includes memory 412. Memory 412 may also be realized in any of the memory formats or combination of memory formats described above with reference to media 108, including as a RAM and/or as a non-volatile memory that is based on solid-state or rotating-disk technology. Memory 412 stores firmware 414 and other information 416. Also, memory 412 may store application components 410. Firmware 414 typically includes at least the basic operating instructions for initially starting and configuring peripheral 104, but it may include most or even all of the instructions used by processors 408 to operate peripheral 104. Other information 416 reflects the various additional types of permanent or transient information that may be necessary or desirable for operating peripheral 104, depending on the type of peripheral and the complexity of any given particular peripheral 104 as well as the task being accomplished by the peripheral.

Figure 5:
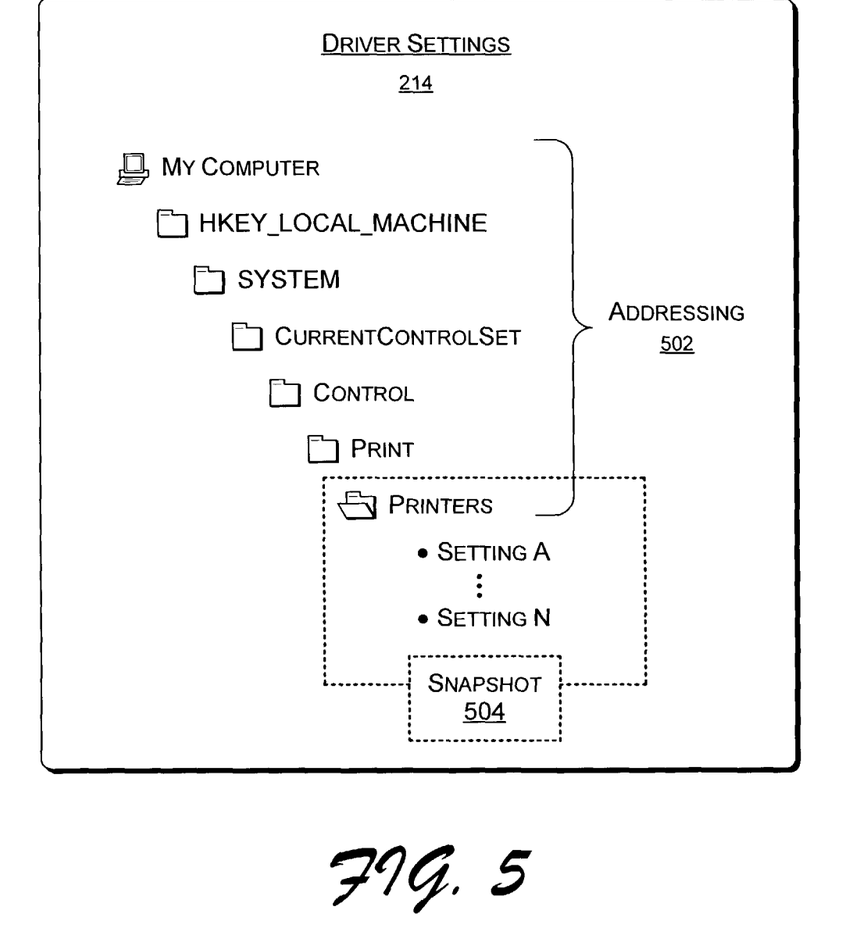
FIG. 5 illustrates an exemplary driver settings space that stores driver settings.

FIG. 5 illustrates an exemplary driver settings space that stores driver settings. Driver settings 214 may include multiple driver settings that correspond to multiple drivers (e.g., of drivers 216 (of FIG. 2)). For example, in an implementation in which peripheral 104 is a printer, printer driver settings are stored in driver settings 214. More specifically, in a Microsoft Windows® operating system implementation, printer driver settings are located in a file that may be accessed (e.g., retrieved from, loaded to, etc.) using addressing 502. Addressing 502 includes the following set of nested folder titles in the Microsoft Windows® registry: HKEY_LOCAL_MACHINE\SYSTEM\CurrentControlSet\Control\Print\Printers.

The printer driver settings are located in a printer driver settings (memory) space under the Printers folder. The one or more possible driver settings are represented by "Setting A" to "Setting N". For printers, these user-selectable driver settings may include, for example: economy mode status, duplex mode status, pages-per-sheet selection, resolution selection, default paper source identification, and default watermark identification. Other printer driver settings may alternatively be stored and maintained during printer driver upgrading as described herein. Typically, these printer driver settings may be set by a user via operating system 204 (of FIG. 2) of computer 102, for example using a printer-related window control panel.

As is described further below with reference to the flow diagrams of FIGS. 6-8, these printer driver settings "A, . . . N" may be maintained when upgrading from an old printer driver to a new printer driver even when a name of the new printer driver differs from a name of the old printer driver. This printer driver settings maintenance is enabled, at least in part, by taking a snapshot 504 of the printer driver settings prior to upgrading the printer driver and then reestablishing the printer driver settings after the printer driver upgrade. In alternative implementations with the Microsoft Windows® operating system, other addressing/file locations may be used to acquire/store driver settings, including both printer and non-printer driver settings. Additionally, the addressing approach as well as the file location may differ from this described implementation when other operating system(s) are employed by computer 102. Furthermore, any given particular file location may include additional information beyond one or more driver settings, and it may also include driver settings for more than one corresponding driver.

Applications implementing driver upgrading may be described in the general context of electronically-executable instructions. Generally, electronically-executable instructions include routines, programs, objects, components, data structures, and the like that perform particular functions or implement particular abstract data types. Driver upgrading as described herein may also be implemented in distributed computing environments where functions are performed by computers that are remote from the affected peripheral but linked through a communications network or otherwise remotely coupled thereto. Especially in such distributed computing environments, electronically-executable instructions may be located in both local and remote storage media, as well as in signals extant on one or more transmission media.

Figure 6:
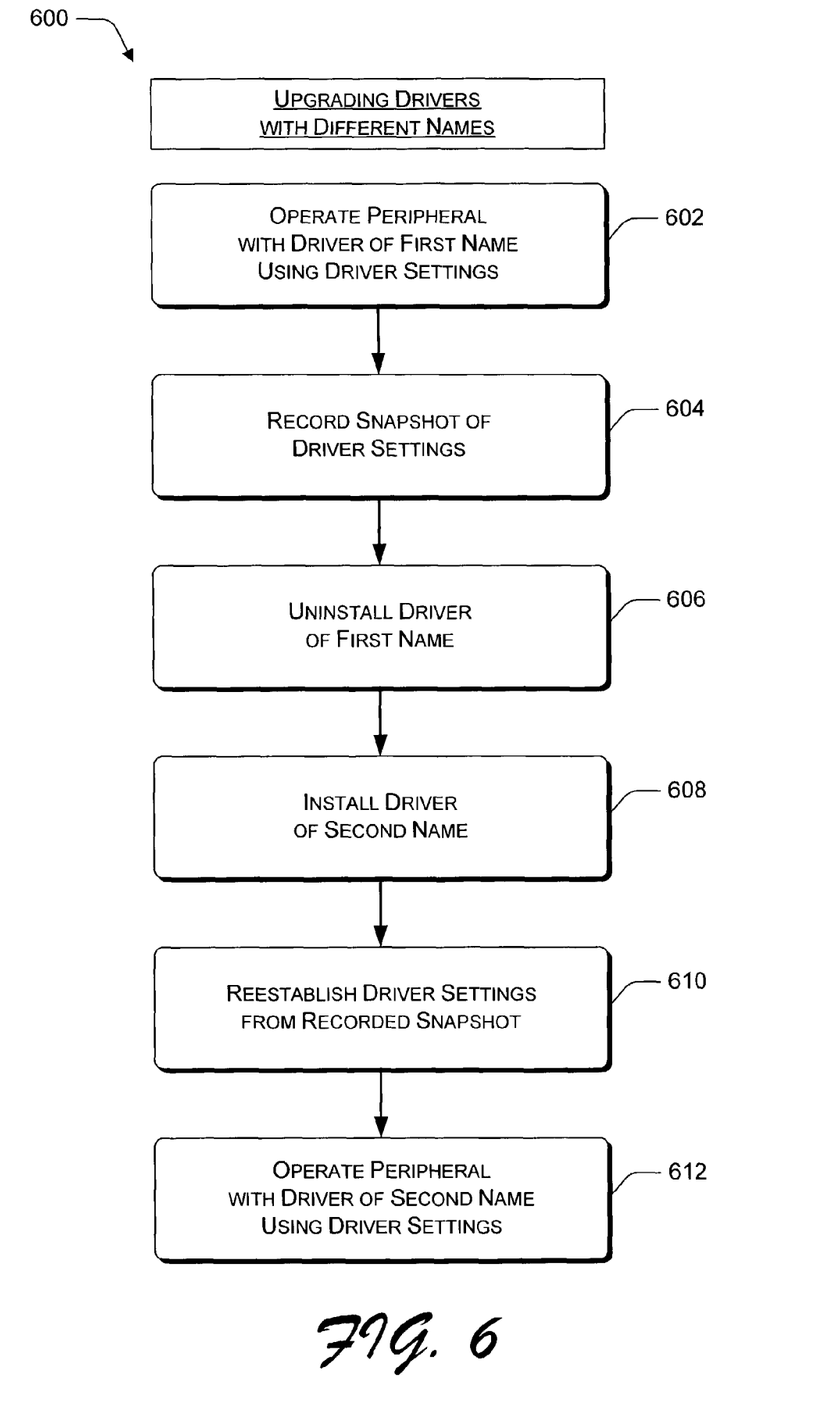
FIG. 6 is a flow diagram that illustrates an exemplary method for upgrading drivers with different names.
Figure 7:
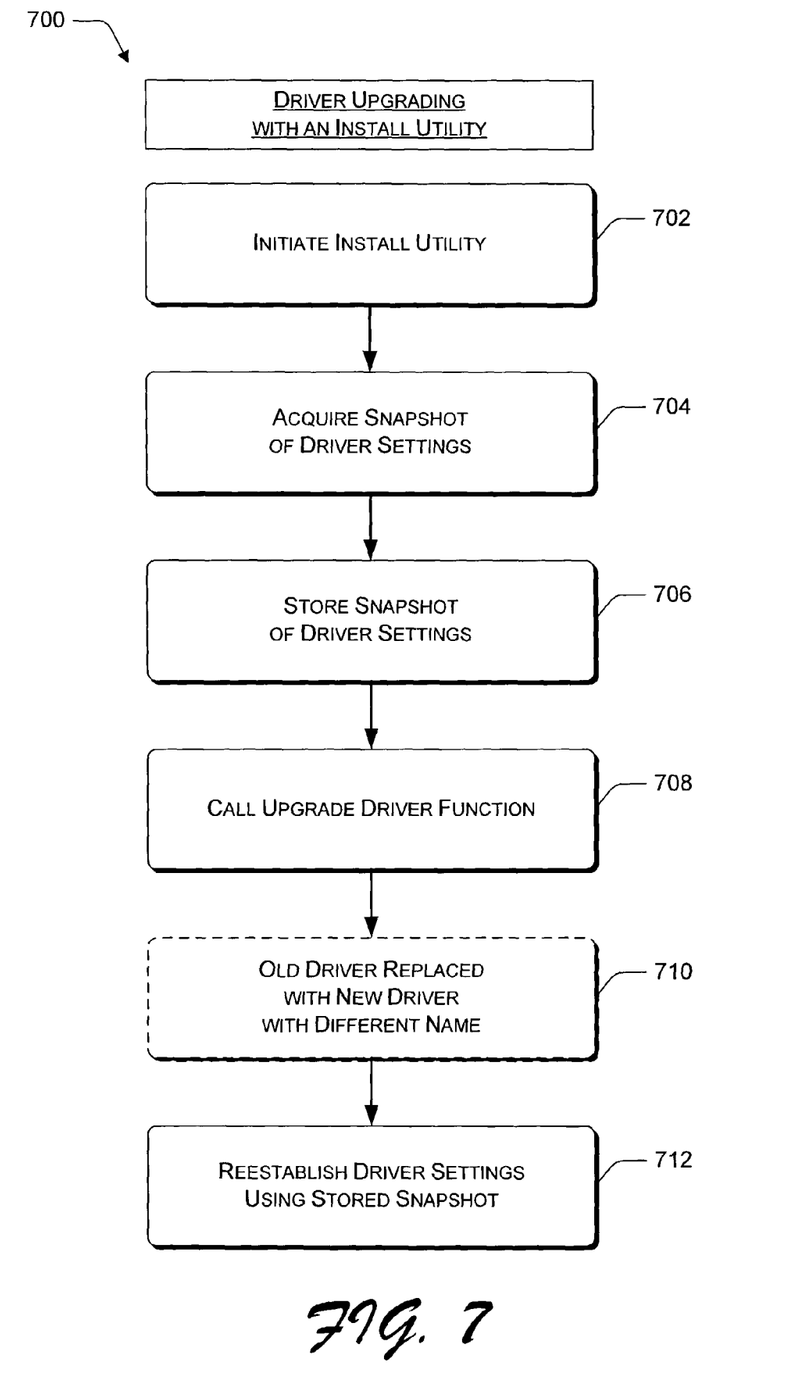
FIG. 7 is a flow diagram that illustrates an exemplary method for driver upgrading using an installation utility.
Figure 8:
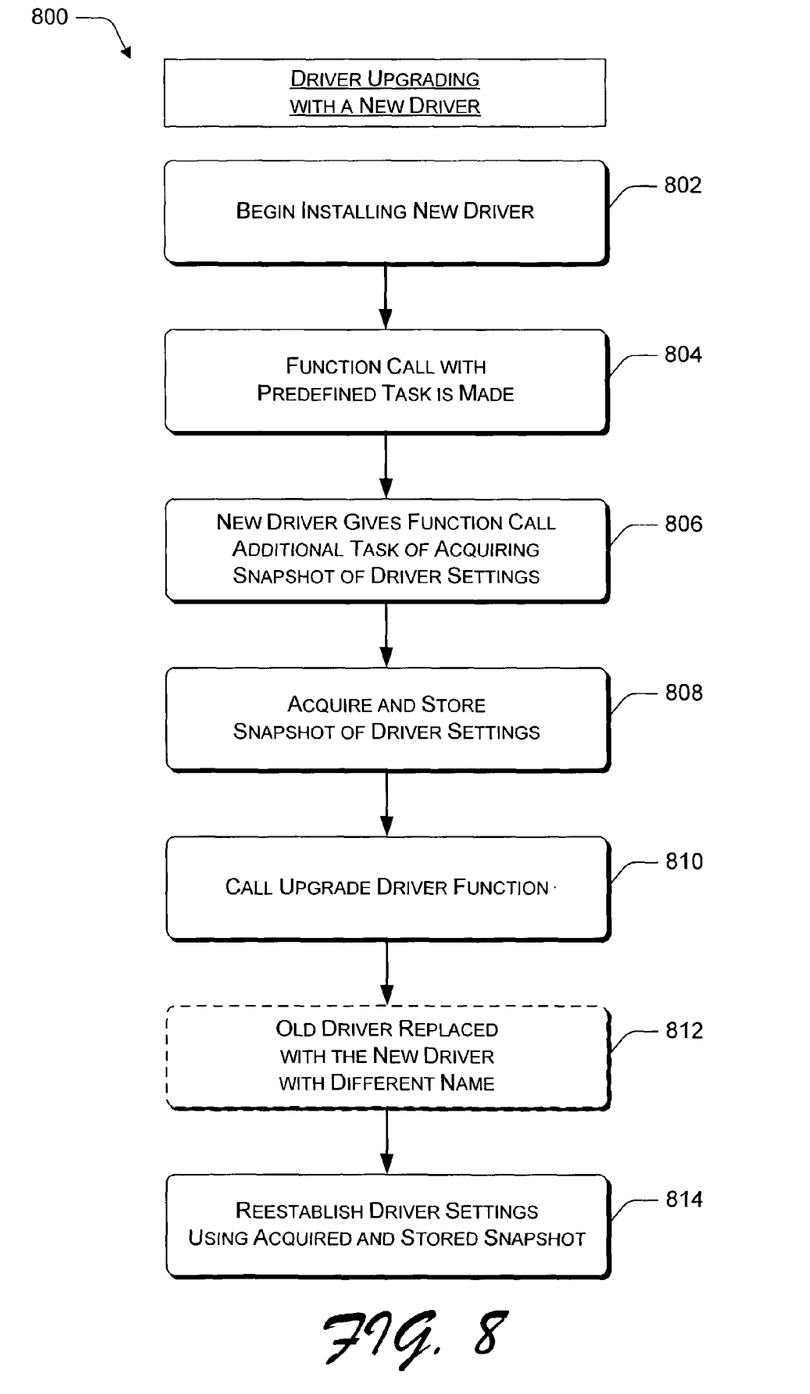
FIG. 8 is a flow diagram that illustrates an exemplary method for driver upgrading using a new driver.

The methods of FIGS. 6-8 are illustrated in flow diagrams divided into multiple method blocks. However, the order in which the methods are described is not intended to be construed as a limitation, and any number of the described method blocks can be combined in any order to implement one or more methods for driver upgrading. Furthermore, although the methods of FIGS. 6-8 are described below with reference to computing system 100 and FIGS. 2-5 where applicable, the methods can be implemented in any suitable hardware, software, firmware, media, or combination thereof.

FIG. 6 is a flow diagram 600 that illustrates an exemplary method for upgrading drivers with different names. Flow diagram 600 includes six (6) method blocks 602-612. It is directed to upgrading from a driver of a first name to a driver of a second name. At block 602, a peripheral is operated with the driver of the first name using driver settings. For example, a computer 102 may operate a peripheral 104 such as a printer using a driver of drivers 216 along with driver settings of driver settings 214. In a Microsoft Windows® operating system environment with a printer peripheral 104, printer driver settings may be located in a printers folder of the Windows® operating system registry.

A driver upgrade may be initiated in any of a number of manners. In a Microsoft Windows® operating system environment, for example, a user may trigger the operating system to perform a printer driver upgrade through several routes, including via the "Printers" folder of the "Control Panel". For instance, the user can (i) select "Add Printer"; (ii) select "File/Server Properties" from the menu structure, followed by the "Drivers" tab and the "Add . . . " button; (iii) select the <name of printer to have its driver upgraded>, and then "File/Properties" from the menu structure, followed by the "Advanced" tab and the "New Driver . . . " button; (iv) start/launch a printer driver installation utility, which indirectly triggers the operating system to perform an upgrade; and so forth.

At block 604, a snapshot is recorded of the driver settings. For example, a snapshot 504 of the printer driver settings that are accessed using addressing 502 in a Microsoft Windows® operating system implementation may be recorded. In other words, snapshot 504 may be retrieved from a file location using an address incorporating the following: HKEY_LOCAL_MACHINE\SYSTEM\CurrentControlSet\Control\Print\Printers. Snapshot 504 may be recorded by storing it somewhere besides the driver settings space from which it was retrieved. For example, snapshot 504 may be stored elsewhere in memory 212, on media 108, in memory 412, and so forth.

At block 606, the driver of the first name is uninstalled. For example, computer 102 can uninstall the driver of the first name by removing it from drivers 216. In a Microsoft Windows® operating system environment with a printer peripheral 104, a DrvUpgradePrinter function of the driver of the second name may be called by the operating system 204 to precipitate the performance of the upgrade. In this context, the DrvUpgradePrinter function call may be considered an exported function call that is made on behalf of the driver of the second name.

At block 608, the driver of the second name is installed. Before a DrvUpgradePrinter function call is made, the Microsoft Windows® operating system compares the names of the first (printer) driver and the second (printer) driver. If the names do not match, then the operating system automatically deletes the printer driver settings that were in place for the first driver before replacing the first driver with the second driver in drivers 216. Consequently, there needs to be some mechanism and/or manner for obtaining the driver settings of the first (printer) driver when, and after, the Microsoft Windows® operating system calls the DrvUpgradePrinter function of the second (printer) driver.

At block 610, the driver settings that were recorded in the snapshot are reestablished. For example, the driver settings that were stored somewhere other than the file location from which they were originally retrieved are loaded "back" into the file location space of driver settings 214 from which they were originally retrieved. With Windows®, the snapshot 504 that was stored at a different or other memory location elsewhere in memory 212, in media 108, in memory 412, etc. is retrieved and loaded back into the original file location (e.g., using addressing 502). In other words, the driver settings of the snapshot 504 are loaded into the file location that corresponds to the driver settings space that was accessible for the driver of the first name. In this manner, the driver settings are reestablished such that they become accessible for the driver of the second name.

At block 612, the peripheral is operated with the driver of the second name using the driver settings. For example, computer 102 may operate a printer peripheral 104 using a printer driver of drivers 216 along with printer driver settings of driver settings 214. In a Microsoft Windows® operating system environment with such a printer peripheral 104, the printer driver settings are used by accessing them from the file location in the printers folder of the Windows® operating system registry that is associated with the printer peripheral 104. Thus, the driver of the second name can be used to operate a (printer) peripheral using the same printer driver settings regarding duplex, resolution, paper source, etc. without a user needing to reenter or otherwise reset them even though the names of the two drivers differ.

As indicated above, the methods of FIGS. 6-8 are illustrated in flow diagrams that may be implemented as electronically-executable instructions. For example, one or more electronically-accessible media may include electronically-executable instructions that, when executed, direct an electronic apparatus to override an operating system when upgrading from an old driver to a new driver if the operating system erases driver settings when an old name for the old driver differs from a new name for the new driver. The electronically-executable instructions may be configured to cause (i) a recordation of the driver settings prior to their erasure by the operating system and (ii) a reestablishment of the recorded driver settings after the upgrading from the old driver to the new driver.

Flow diagram 600 of FIG. 6 illustrates an exemplary general approach to upgrading drivers that have different names. The flow diagrams of FIGS. 7 and 8, on the other hand, illustrate two exemplary specific approaches to upgrading drivers that have different names. Flow diagram 700 (of FIG. 7) is directed to driver upgrading with an install utility, and flow diagram 800 (of FIG. 8) is directed to driver upgrading with a new driver.

FIG. 7 is a flow diagram 700 that illustrates an exemplary method for driver upgrading using an installation utility. Flow diagram 700 includes six (6) method blocks 702-712. It is directed to upgrading drivers using a separate or separable install utility that may optionally be distributed with a new driver. For example, a driver installation utility 304 (of FIG. 3) may be distributed on the same media 108 as a new driver 302.

At block 702, the install utility is initiated. For example, a user at a computer 102 may access media 108 to launch/start driver installation utility 304. Alternatively, the user may begin the installation utility using peripheral 104. At block 704, the install utility acquires a snapshot of driver settings, which are accessible for an old driver. For example, in a Windows® printer driver implementation, the install utility may access memory 212 at driver settings 214 for a particular file location using addressing 502 to acquire snapshot 504.

At block 706, the install utility stores the snapshot of the driver settings. For example, the snapshot may be stored in a different location of memory 212 (e.g., not the same particular file location of driver settings 214), on media 108, in memory 412, and so forth. At block 708, an upgrade driver function is called. In the described Windows® printer driver implementation, the install utility calls an AddPrinterDriver (Ex) and/or an AddPrinter function. The operating system in turn calls the DrvUpgradePrinter function of the new driver. Generally, making the upgrade driver function call causes operating system 204, at block 710, to replace the old driver with the new driver. Block 710 is illustrated with dashed lines to indicate that the replacement may occur without direct manipulation by the install utility inasmuch as the operating system may call the exported upgrade driver function (e.g., under the control/guidance of the print spooler). In described implementations, the new driver has a different name from the old driver.

At block 712, the install utility reestablishes the driver settings from the stored snapshot. The driver settings are reestablished for use by and/or with the new driver. For example, a driver installation utility 304 can extract the driver settings from stored snapshot 504 from a memory location and load the driver settings from the (extracted) snapshot 504 into a file location that corresponds to the driver settings space of driver settings 214. This file location corresponding to the driver settings space may be accessed using addressing 502 and may be associated with the new driver, as well as being accessible for the new driver.

FIG. 8 is a flow diagram 800 that illustrates an exemplary method for driver upgrading using a new driver. Flow diagram 800 includes seven (7) method blocks 802-814. It is directed to upgrading drivers using a new driver. For example, a new driver 302 (of FIG. 3) may be distributed on one or more media 108 for upgrading from an old driver to the new driver.

At block 802, the installation of the new driver is begun. For example, a user may double-click or otherwise run a file/program of new driver 302. This user may be acting locally or remotely. Also, the user may trigger a Microsoft® operating system to perform a printer driver upgrade through any of the options (i), (ii), or (iii) as described above with reference to FIG. 6. Alternatively, the new driver installation may be started automatically, for example as part of a regularly-scheduled upgrade process.

At block 804, a function call that has a predefined task is made. In a Microsoft Windows® operating system environment in which a printer driver is being upgraded, this function call may be, for example, the DrvDriverEvent function call. This function call is made for the predefined task of allowing a printer driver's printer interface DLL to perform operations needed when the printer driver is being installed or removed.

Specifically, the DrvDriverEvent function may be called by the print spooler's AddPrinterDriverEx function. In the context of block 804, this function call may be an exported function of the old driver or the new driver. If this function call is an exported function call of the old driver, then the "dwDriverEvent" variable of the DrvDriverEvent function call may have a "DRIVER_EVENT_DELETE" flag. If this function call is an exported function call of the new driver, then the "dwDriverEvent" variable may have a "DRIVER_EVENT_INITIALIZE" flag.

Alternatively, the function call of block 804 may be a DllMain exported function call for the new driver. In this case, the "fdwReason" variable may be given the "DLL_PROCESS_ATTACH" value. Other function calls may possibly be used instead in a Microsoft Windows® operating system environment. Additionally, alternative function calls may be used in other operating system environments.

At block 806, the new driver gives/provides the function call (of block 804) with an additional task that comprises an action of acquiring a snapshot of the driver settings for the old driver. It should be understood that the actions of block 806 are alternatively performed by the old driver when the function call of block 804 is an exported function call of the old driver. Thus, a Microsoft Windows® operating system function call such as DrvDriverEvent or DllMain can be given the additional task of acquiring a snapshot of the current driver settings. The additional task effectively "piggy backs" on the function call having the other, predefined task. The action(s) of block 806 may be performed prior to, substantially simultaneously with, as partially overlapping with, etc. the performance of the action(s) of block 804.

At block 808, the snapshot of the driver settings is acquired and stored. Calling the function (at block 804) with the predefined task effectively results in the acquisition and storage of the snapshot responsive to the additional task given thereto (at block 806). For example, as described further above, a snapshot of the driver settings may be acquired by accessing a file location that is associated with the old driver, where the file location corresponds to a driver settings space that is accessible for the old driver, and by retrieving the driver settings from the file location. A snapshot of the driver settings may be stored by storing the driver settings at a location of a memory that differs from the file location that is associated with the old driver. This memory location may be another portion of memory 212, a part of media 108, a part of memory 412, and so forth.

At block 810, an upgrade driver function is called. In the described Windows® printer driver implementation, the operating system (e.g., as represented by the print spooler) calls the DrvUpgradePrinter function. Generally, making the upgrade driver function call causes operating system 204, at block 812, to replace the old driver with the new driver. Block 812 is illustrated with dashed lines to indicate that the replacement may occur without direct instigation by the new driver inasmuch as the operating system may call the exported upgrade driver function (e.g., under the control/guidance of the print spooler). In described implementations, the new driver has a different name from the old driver.

At block 814, the new driver reestablishes or causes to be reestablished the driver settings from the acquired and stored snapshot. The driver settings are reestablished for use by and/or with the new driver. For example, the driver settings may be extracted from the acquired and stored snapshot 504 of the memory location and loaded into the file location that corresponds to the driver settings space of driver settings 214. This file location that corresponds to the driver settings space may be accessed using addressing 502 and may be associated with the new driver, as well as being accessible for the new driver.

The new driver may reestablish the driver settings (i) "directly" or (ii) "indirectly" by way of extending an existing function call. The new driver may directly reestablish the driver settings by effectuating the extraction and loading as described above, by transferring at least a copy of the driver settings from the memory location "back" to the file location, and so forth. Alternatively, the new driver may add an additional task to a function call with a different predefined task. For example, the new driver may add an additional task to an existing exported function that is called by the operating system after driver upgrading such that the additional task causes the driver settings to be reestablished.

This function call approach may indirectly reestablish the driver settings by effectuating the extraction and loading as described above, by transferring at least a copy of the driver settings from the memory location "back" to the file location, and so forth. In the described Windows® printer driver implementation, the new driver can reestablish the driver settings using the acquired and stored snapshot after the Microsoft® operating system (e.g., as represented by the print spooler) calls the DrvUpgradePrinter function when the new driver adds such a driver settings reestablishment task thereto.

Although implementation(s) of apparatuses, methods, systems, and arrangements have been illustrated in the accompanying Drawings and described in the foregoing Detailed Description, it will be understood that the present invention is not limited to the implementation(s) explicitly disclosed, but is capable of numerous rearrangements, modifications, substitutions, etc. without departing from the spirit and scope set forth and defined by the following claims.

What is claimed is:

1. A method for upgrading drivers, the method comprising actions of:
   operating a peripheral with a first driver having a first name using a plurality of driver settings;
   recording a snapshot of the plurality of driver settings, the action of recording comprising:
     accessing a file location that is associated with the peripheral on a computer that is coupled to the peripheral;
     retrieving the plurality of driver settings from the file location; and
     storing the plurality of driver settings in a memory of the peripheral at a location of the memory differing from the file location;
   calling an upgrade driver function that causes the first driver to be replaced with a second driver, a name of the second driver differing from the name of the first driver, wherein the calling is associated with a plurality of actions that occur prior thereto, the plurality of actions comprising:
     comparing the name of the second driver to the name of the first driver;
     determining whether the name of the second driver differs from the name of the first driver; and
     erasing the plurality of driver settings from a file location that is associated with the first driver when the name of the second driver differs from the name of the first driver;
   uninstalling the first driver;
   installing the second driver;
   reestablishing the plurality of driver settings from the recorded snapshot; and
   operating the peripheral with the second driver using the plurality of driver settings.

2. The method of claim 1, wherein the file location is addressable using, at least partly, HKEY_LOCAL_MACHINE\SYSTEM\CurrentControlSet\Control\Print\Printers.

3. The method of claim 1, wherein the actions of uninstalling and installing are performed responsive to an action of calling an upgrade driver function.

4. The method of claim 3, wherein the action of calling an upgrade driver function comprises calling an upgrade printer driver function.

5. The method of claim 3, wherein the action of calling an upgrade driver function comprises making a DrvUpgradePrinter call in an operating system (OS) environment.

6. The method of claim 3, wherein the action of calling an upgrade driver function comprises calling an exported function.

7. The method of claim 1, wherein the action of reestablishing comprises:
   extracting the recorded snapshot from the memory of the peripheral; and
   loading the plurality of driver settings from the recorded snapshot into a driver settings space that is accessible for the second driver.

8. The method of claim 1, wherein the method is effectuated at least partially by an install utility.

9. The method of claim 1, wherein the method is effectuated at least partially by functions called by or on behalf of the first driver and/or the second driver.

10. A method for upgrading drivers in a computer, the method comprising actions of:
   ascertaining driver settings for a peripheral from a file location that is associated with the old driver; storing the driver settings for the peripheral at a memory location in the peripheral that is coupled to the computer, the memory location differing from the file location; upgrading the driver by causing an old driver to be replaced with a new driver, a name of the new driver differing from a name of the old driver, wherein the upgrading is associated with a plurality of actions that occur prior thereto, the plurality of actions comprising:
comparing the name of the new driver to the name of the old driver; determining whether the name of the new driver differs from the name of the old driver; and erasing the plurality of driver settings from the file location when the name of the new driver differs from the name of the old driver; and
reestablishing the driver settings for the new driver associated with the peripheral after operation of the upgraded driver;
wherein calling the upgraded driver for the peripheral includes changing driver names and replacing the driver with the upgraded driver.

11. The method of claim 10, wherein the action of ascertaining comprises:
accessing a file location that is associated with the peripheral on the computer that is coupled to the peripheral; and
retrieving the driver settings for the peripheral from the file location.

12. The method of claim 10, wherein the action of reestablishing comprises:
extracting the driver settings from the memory location in the peripheral; and
loading the driver settings into a driver settings space that is accessible for the upgraded driver.

13. The method of claim 10, wherein the driver and the upgraded driver comprise printer drivers.

14. The method of claim 10, wherein the method is effectuated at least partially by an install utility.

15. The method of claim 10, wherein the method is effectuated at least partially by functions called by or on behalf of the driver and/or the upgraded driver.

16. The method of claim 10, wherein the method is performed in an operating system (OS) environment.

17. A method for upgrading one or more drivers using an install utility, the method comprising actions of:
acquiring a snapshot of a plurality of driver settings for an old driver, wherein the action of acquiring comprises:
accessing a file location that is associated with the old driver, the file location corresponding to a driver settings space that is accessible for the old driver; and
retrieving the plurality of driver settings from the file location;
storing the snapshot of the plurality of driver settings in a memory, wherein the action of storing comprises:
storing the snapshot of the plurality of driver settings at a location of the memory, the location of the memory differing from the file location;
calling an upgrade driver function that causes the old driver to be replaced with a new driver, a name of the new driver differing from a name of the old driver, wherein the action of calling is associated with a plurality of actions that occur prior thereto, the plurality of actions comprising:
comparing the name of the new driver to the name of the old driver; and
determining whether the name of the new driver differs from the name of the old driver; and
erasing the plurality of driver settings from the file location that is associated with the old driver when the name of the new driver differs from the name of the old driver; and
reestablishing the plurality of driver settings from the stored snapshot.

18. The method of claim 17, further comprising:
initiating the install utility from a computer associated with a peripheral, the old driver and the new driver enabling the computer to control the peripheral.

19. The method of claim 17, wherein the old driver and the new driver comprise printer drivers.

20. The method of claim 17, wherein the action of erasing is performed by an operating system of a computer.

21. The method of claim 17, wherein the action of reestablishing comprises:
transferring at least a copy of the plurality of driver settings from the stored snapshot at the location of the memory to the file location corresponding to the driver settings space that is accessible for the new driver.

22. The method of claim 17, wherein the action of reestablishing comprises:
retrieving the plurality of driver settings for the old driver from the stored snapshot at the location of the memory;
converting the plurality of driver settings for the old driver into a plurality of driver settings for the new driver; and
loading the plurality of driver settings for the new driver into the file location corresponding to the driver settings space that is accessible for the new driver.

23. A method for upgrading one or more drivers using a new driver, the method comprising actions of:
making a first function call having a predefined task;
providing the first function call with an additional task, the additional task including acquiring a snapshot of a plurality of driver settings for an old driver, wherein the additional task of acquiring a snapshot comprises:
accessing a file location that is associated with the old driver, the file location corresponding to a driver settings space that is accessible for the old driver;
retrieving the plurality of driver settings from the file location; and
storing the snapshot of the plurality of driver settings at a memory location in a peripheral device differing from the location of the file location;
making an upgrade driver function call having a replacement task that causes the old driver to be replaced with the new driver, a name of the new driver differing from a name of the old driver, wherein making the upgrade driver function call is associated with a plurality of actions that occur prior thereto, the plurality of actions comprising:
comparing the name of the new driver to the name of the old driver;
determining whether the name of the new driver differs from the name of the old driver; and
erasing the plurality of driver settings from a file location that is associated with the old driver when the name of the new driver differs from the name of the old driver; and
making a second function call having a reestablishment task that reestablishes the plurality of driver settings from the acquired snapshot for use with the new driver.

24. The method of claim 23, wherein the first function call comprises at least one of a DrvDriverEvent function call and a DllMain function call.

25. The method of claim 23, wherein the actions of making a first function call and making an upgrade driver function call are performed by an operating system.

26. The method of claim 23, wherein the action of providing occurs prior to the action of making a first function call; or wherein the actions of providing and making a first function call at least partially overlap.

27. The method of claim 23, wherein the second function call comprises the upgrade driver function call; and wherein the action of making a second function call comprises providing the upgrade driver function call with the reestablishment task that reestablishes the plurality of driver settings from the acquired snapshot for use with the new driver.

28. The method of claim 23, wherein the first function call, the upgrade driver function call, and the second function call comprise exported function calls.

29. The method of claim 23, wherein the reestablishment task that reestablishes the plurality of driver settings comprises:
retrieving the plurality of driver settings of the snapshot;
converting the plurality of driver settings from a format that is appropriate for the old driver into a format that is appropriate for the new driver; and
loading the converted plurality of driver settings that are in the format that is appropriate for the new driver into a file location that corresponds to a driver settings space that is accessible for the new driver.

30. The method of claim 23, wherein the upgrade driver function call comprises a DrvUpgradePrinter call of an operating system, the DrvUpgradePrinter call precipitating an erasing of the plurality of driver settings for the old driver from a file location corresponding to a driver settings space that is accessible for the old driver prior to upgrading to the new driver when the name of the new driver differs from the name of the old driver.

31. One or more non-transitory computer-readable media comprising computer-executable instructions that, when executed, direct an electronic apparatus to: acquire a snapshot of a plurality of driver settings for an old driver from a file location that is associated with the old driver; store the snapshot of the plurality of driver settings in a memory of a peripheral device associated with the driver settings at a location of the memory differing from the file location; call an upgrade driver function that causes the old driver to be replaced with a new driver, a name of the new driver differing from a name of the old driver, wherein the action of calling is associated with a plurality of actions that occur prior thereto, the plurality of actions comprising: comparing the name of the new driver to the name of the old driver; determining whether the name of the new driver differs from the name of the old driver; and erasing the plurality of driver settings from the file location when the name of the new driver differs from the name of the old driver; and reestablish the plurality of driver settings from the stored snapshot.

32. The one or more non-transitory computer-readable media as recited in claim 31, wherein the computer-executable instructions comprise, at least partly, a printer installation utility.

33. One or more non-transitory computer-readable media comprising computer-executable instructions that, when executed, direct an electronic apparatus to:
make a first function call having a predefined task;
provide the first function call with an additional task, the additional task including acquiring a snapshot of a plurality of driver settings for an old driver, wherein the additional task of acquiring a snapshot comprises instructions to:
access a file location that is associated with the old driver, the file location corresponding to a driver settings space that is accessible for the old driver;
retrieve the plurality of driver settings from the file location; and
store the snapshot of the plurality of driver settings at a memory location in a peripheral device at a location of the memory differing from the file location;
make an upgrade driver function call having a replacement task that causes the old driver to be replaced with a new driver, a name of the new driver differing from a name of the old driver; and
provide the upgrade driver function call with a reestablishment task that establishes the plurality of driver settings from the acquired snapshot for use with the new driver, wherein the action of providing the upgrade call is associated with a plurality of actions that occur prior thereto, the plurality of actions comprising:
comparing the name of the new driver to the name of the old driver;
determining whether the name of the new driver differs from the name of the old driver; and
erasing the plurality of driver settings from a file location that is associated with the old driver when the name of the new driver differs from the name of the old driver.

34. The one or more non-transitory computer-readable media as recited in claim 33, wherein the computer-executable instructions comprise, at least partly, the new driver; and wherein the new driver comprises a new printer driver.

35. The one or more non-transitory computer-readable media as recited in claim 33, wherein the plurality of driver settings comprise at least one of economy mode status, duplex mode status, pages-per-sheet selection, resolution selection, default paper source identification, and default watermark identification.

36. A system for upgrading drivers, the system configured to perform actions comprising: operate a peripheral with a driver having a first name using a plurality of driver settings stored in a file location that is associated with the driver with the first name; record a snapshot of the plurality of driver settings in a memory of the peripheral at a location of the memory differing from the file location, wherein the peripheral is an imaging device; uninstall the driver having the first name; install a driver having a second name, the second name differing from the first name, such that the driver having the second name replaces the driver having the first name, wherein installing the driver is associated with a plurality of actions that occur prior thereto, the plurality of actions comprising: comparing the second name to the first name; determining whether the second name of differs from the first name; and erasing the plurality of driver settings from the file location when the name of the driver with the second name differs from the name of the driver with the first name; reestablish the plurality of driver settings from the recorded snapshot; and operate the peripheral with the driver having the second name using the plurality of driver settings so that the system has performed a driver upgrade from the driver having the first name to the driver having the second name.

37. The system of claim 36, wherein the system comprises a computer and the peripheral.

38. The system of claim 36, wherein the system comprises a computer and one or more computer-readable media comprising computer-executable instructions.

39. An arrangement for upgrading printer drivers, the arrangement comprising: means for ascertaining driver settings for a printer, the driver settings stored in a file location that is associated with a current printer driver; means for storing the driver settings for the printer at a memory location in the printer at a location differing from the file location; means for upgrading a current printer driver for the printer to an upgraded printer driver, the means for upgrading operating after the means for ascertaining; and means for reestablishing the driver settings for the printer, the means for reestablishing operating after the means for upgrading, wherein the means for reestablishing comprising: comparing a name of the upgraded printer driver to the name of the current printer driver; determining whether the name of the upgraded printer driver differs from the name of the current printer driver; and erasing a plurality of driver settings from the file location when the name of the upgraded printer driver differs from the name of the current printer driver; wherein the means for upgrading a current printer driver for the printer operates to change names of the printer driver and to replace the current printer driver with the upgraded printer driver.

40. The arrangement of claim 39, wherein the arrangement comprises computer-readable media means for upgrading printer drivers.

41. The arrangement of claim 39, wherein the arrangement comprises a computer.

42. The arrangement of claim 39, wherein the driver settings for the printer comprise at least one of economy mode status, duplex mode status, pages-per-sheet selection, resolution selection, default paper source identification, and default watermark identification.

43. One or more non-transitory computer-readable media comprising a printer driver install utility that, when executed, directs an electronic apparatus to: acquire a snapshot of a plurality of printer driver settings for an old printer driver the printer driver settings stored in a file location that is associated with the old printer driver; store the snapshot of the plurality of printer driver settings in a memory of a printer associated with the old printer driver at a location of the memory differing from the file location; ascertain that an upgrade printer driver function has been called to cause the old printer driver to be replaced with a new printer driver, a name of the new printer driver differing from a name of the old printer driver, wherein the upgrade printer driver function is associated with a plurality of actions that occur prior thereto, the plurality of actions comprising: comparing the name of the new printer driver to the name of the old printer driver; determining whether the name of the new printer driver differs from the name of the old printer driver; and erasing the plurality of driver settings from the file location when the name of the new printer driver differs from the name of the old printer driver; and reestablish the plurality of printer driver settings from the stored snapshot after the upgrade printer driver function has been called.

44. A method for upgrading drivers, the method comprising actions of: establishing a plurality of driver settings for use with a first driver having a first name, the driver settings stored in a file location that is associated with the first driver; recording a snapshot of the plurality of driver settings in a memory location in a printer associated with the plurality of driver settings at a location differing from the file location; uninstalling the first driver; installing a second driver having a second name, the second name differing from the first name, such that the second driver replaces the first driver, wherein installing the second driver comprises: comparing the second name to the first name; determining whether the second name differs from the first name; and erasing the plurality of driver settings from the file location when the name of the new driver differs from the name of the old driver; and reestablishing the plurality of driver settings from the recorded snapshot for use with the second driver to thereby upgrade from the first driver to the second driver.

45. One or more non-transitory computer-readable media comprising a new printer driver that, when executed, directs an electronic apparatus to: ascertain that a first function call having a predefined task has been called; provide the first function call with at least one additional task, the at least one additional task including acquiring and storing a snapshot of a plurality of printer driver settings for an old printer driver at a memory location in a printer associated with the old printer driver and differing from a file location storing the printer driver settings and that is associated with the old printer driver; ascertain that an upgrade printer driver function has been called to cause the old printer driver to be replaced with the new printer driver, a name of the new printer driver differing from a name of the old printer driver, wherein the calling of the upgrade printer driver function is associated with a plurality of actions that occur prior thereto, the plurality of actions comprising: comparing the name of the new printer driver to the name of the old printer driver; determining whether the name of the new printer driver differs from the name of the old printer driver; and erasing the plurality of driver settings from the file location when the name of the new printer driver differs from the name of the old printer driver; and cause a second function call to result in reestablishment of the plurality of printer driver settings from the acquired and stored snapshot after the upgrade printer driver function has been called.

46. The one or more non-transitory computer-readable media as recited in claim 45, wherein the second function call comprises the upgrade printer driver function.

47. One or more non-transitory computer-readable media comprising computer-executable instructions that, when executed, direct an electronic apparatus to: override an operating system when upgrading from an old driver to a new driver if the operating system erases driver settings when an old name for the old driver differs from a new name for the new driver, wherein the driver settings are stored in a file location associated with the old driver; the computer-executable instructions configured to cause a recordation of the driver settings in a memory location in a printer associated with the old driver, the memory location differing from the file location, prior to erasure by the operating system and a reestablishment of the recorded driver settings after the upgrading from the old driver to the new driver, wherein overriding the operating system is associated with a plurality of actions that occur prior thereto, the plurality of actions comprising: comparing the name of the new driver to the name of the old driver; determining whether the name of the new driver differs from the name of the old driver; and erasing the plurality of driver settings from the file location when the name of the new driver differs from the name of the old driver; wherein the upgrading includes uninstalling the old driver and replacing the old driver with the new driver.

48. The one or more non-transitory computer-readable media as recited in claim 47, wherein the computer-executable instructions comprise at least part of a driver installation utility.

49. The one or more non-transitory computer-readable media as recited in claim 47, wherein the computer-executable instructions comprise at least part of the new driver.

50. The one or more non-transitory computer-readable media as recited in claim 47, wherein the computer-executable instructions are adapted to cause the recordation of the driver settings by causing an acquisition and a storage of a snapshot of the driver settings; and wherein the driver settings comprise printer driver settings.

* * * * *

UNITED STATES PATENT AND TRADEMARK OFFICE
CERTIFICATE OF CORRECTION

| | |
|---|---|
| PATENT NO. | : 8,582,139 B2 |
| APPLICATION NO. | : 10/299168 |
| DATED | : November 12, 2013 |
| INVENTOR(S) | : Metz |

It is certified that error appears in the above-identified patent and that said Letters Patent is hereby corrected as shown below:

In the claims

Column 14, line 8, Claim 33, delete "establishes" and insert -- reestablishes --, therefor.

Column 14, line 44, Claim 36, delete "name of" and insert -- name --, therefor.

Signed and Sealed this
Twelfth Day of January, 2016

Michelle K. Lee
*Director of the United States Patent and Trademark Office*